April 15, 1930.    F. H. OWENS    1,754,282
COLOR SCREEN ACCESSORY FOR CAMERAS
Filed Dec. 18, 1928
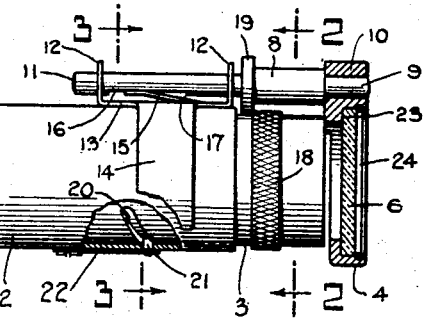
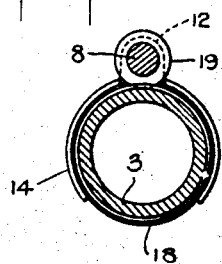
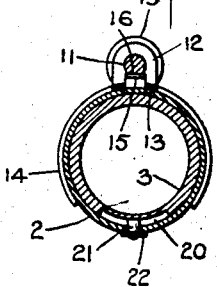
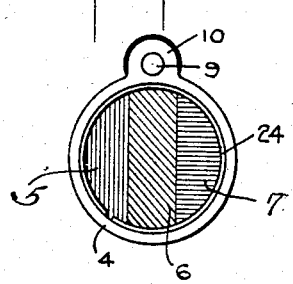
INVENTOR
Freeman H. Owens
BY
ATTORNEYS // patent number 1,754,282

UNITED STATES PATENT OFFICE

FREEMAN H. OWENS, OF NEW YORK, N. Y.

COLOR-SCREEN ACCESSORY FOR CAMERAS

Application filed December 18, 1928. Serial No. 326,868.

My invention relates to an accessory for a camera and particularly to an attachment for mounting a color screen upon the camera so that the latter can be used in color photography.

An object of the invention is to provide an attachment which carries a color screen comprising the usual transparent panels in the important colors red, green and blue, and which is adapted to be easily mounted upon the camera with which the attachment is to be used and readily dismounted when it is not needed.

A further object of the invention is to provide an accessory for attaching a color screen to a camera, of such design that it can be supported upon the lens casing thereof in which the lens system of the camera is housed; and be actuated by the adjustable part of said lens casing when said part is moved to regulate the effect of the lenses, as by changing the focus of same.

To the accomplishment of the foregoing and such other objects as will hereinafter appear, my invention consists in the elements and their relation one to the other, as hereinafter more particularly described and sought to be defined in the claims; reference being had to the accompanying drawings which show the preferred embodiments of my invention and in which:

Fig. 1 is a side view, part in section, of an accessory according to my invention;

Fig. 2 is a transverse vertical section on the line 2—2 in Fig. 1, looking in the direction of the arrows toward the camera;

Fig. 3 is a transverse vertical section on the line 3—3 in Fig. 1, looking away from the camera; and Fig. 4 is a front elevation of the color screen mounting or accessory according to my invention.

The same numerals identify the same parts throughout.

In the detailed description of what is shown in the drawings, I use the numeral 1 to indicate the body of the camera; which has a lens casing comprising a fixed section 2 and a movable or adjustable section 3, which is telescopically received in the outer end of the section 2. The lenses which focus the image of the picture to be taken upon the film or plate inside the camera are not shown but are disposed within the sections 2 and 3 in the customary way. The accessory is illustrated as mounted upon the lens casing and it comprises an annular support or ring 4 carrying transparent panels colored in red, green and blue and indicated at 5, 6 and 7. These panels are shown as arranged vertically in the support 4 and have the shape of zones entirely filling the circular space encompassed by the support 4.

The ring-shaped support 4 is held in place by means of a stem 8 having a reduced end 9 which is received in an opening in a projection or ear 10 on top of the support, and the stem 8 is mounted on the top of the lens casing of the camera. The end 9 of the stem 8 is affixed to the lug 10 and the opposite end of the stem is reduced as shown at 11 and can slide to some extent in a pair of bearings 12 at the ends of a piece of metal or the like 13 which connects these bearings together. The piece 13 has lateral arms 14 which extend downward and are curved to act as clips and engage the fixed section 2 of the lens casing. These clips 14 are more or less resilient so that they grip the sides of the section 2 firmly and hold the accessory in place. The accessory can therefore either be slipped endwise upon the lens casing when it is to be mounted on the camera or it can be attached by separating the clips 14 and forcing it downward upon the section 2 from above. Further, the piece 13 may be cut between the arms 14 to provide a tongue or catch 15 which is bent upward so as to press upon a flat surface 16 on the lower side of the stem 8 between the bearings 12. This flat surface is provided by notching the cylindrical surface of the stem 8 and terminates in shoulders 17. Thus the stem 8 can slide to some extent in the bearings 12 but cannot easily be withdrawn because the tongue 15 will abut the rear shoulder 17 as soon as the stem 8 is pulled forward the required distance. Of course, the stem 8 with the support 4 could be dismounted from the bearings by forcing the catch 15 downward with a tool and then pulling the stem out.

The adjustable section 3 of the lens casing is provided with an annular milled collar 18 to afford a hold to the operator when the lenses are to be regulated. On the stem 8 at the junction of the thick part thereof with the reduced portion 11 is a flanged collar 19 which is disposed between the collar 18 and the outer extremity of the section 2. The length of the thick part of the stem 8 between the flange 19 and the lug 10 is about the same as the distance between the outer extremity of the adjustable section 3 and the face of the collar 18 which engages the flange 19; so that when the accessory is in position the support 4 bearing the colored transparent panels 5, 6 and 7 is held in engagement with the outer extremity of the section and fits firmly over the same.

With this construction, whenever the operator moves the section 3 outward, the support 4 and stem 8 move with the section 3 as far as the catch 15 and rear shoulder 16 permit. If the section 3 be actuated in the opposite direction, the collar 18 engaging the flange 19 again causes the support 4 with the panels 5, 6 and 7 to move with it; and thus for every position of the section 3, the support 4 with the panels 5, 6 and 7 covers the end of the section 3 and the accessory remains attached to the camera. At the same time the attachment may be taken off at will simply by pulling it with the fingers to disengage it at the clips 14 from the section 2.

The attachment is thus very simple and inexpensive to produce and it can be mounted and dismounted at will without requiring any alteration of the camera or its parts.

The section 3 may be provided with a spiral or diagonal slot 20 which is engaged by a stud 21 on the end of leaf spring 22 secured at its other end to the outside of the section 2. Thus the adjustment of the section 3 can be effected by taking hold of the milled collar 18 and turning the section 3. While the accessory does not turn with the section 3, it nevertheless moves longitudinally in either direction.

The annular support 4 may have an interior shoulder 23 to engage the edges of the panels 5, 6 and 7, and these panels may be held in place by a retaining ring 24 which fits into a groove on the inside of the ring 4 in front of the panels.

While I have shown and described my invention in the preferred forms, many changes and modifications may be made in the structure disclosed without departing from the spirit of the invention, defined in the following claims.

I claim:

1. An accessory for a camera having a lens casing comprising a fixed section and an adjustable section, said accessory comprising a support for a color screen and parts for detachably engaging the fixed section of the lens casing of the camera for mounting the color screen over the outer end of the movable section of the lens casing.

2. An accessory for a camera having a lens casing comprising a fixed section and an adjustable section, said accessory comprising parts to enable it to be detachably mounted on said fixed section, and a movable color screen to be mounted over the end of the adjustable section, said accessory and said adjustable section having parts which so engage that said movable screen and said adjustable section are moved in unison.

3. An accessory for a camera having a lens casing comprising a fixed section and an adjustable section, said accessory comprising arms for detachably gripping the fixed section to mount the accessory in position, a movable holder carrying a color screen to be supported over the outer end of the adjustable section, and means on said holders engaging the adjustable section so that the holder and screen are moved with the adjustable section when the latter is adjusted.

4. An accessory for a camera comprising a fixed section and an adjustable section, the accessory having a stem detachably mounted on the fixed section, a holder for a color screen connected to said stem to be mounted over the end of the adjustable section, and parts on the adjustable section and the stem to cooperate with said holder so that when the adjustable section is moved the screen moves in unison therewith.

5. An accessory for a camera having a lens casing comprising a fixed section and an adjustable section, the accessory having a stem, bearings in which said stem is slidably mounted detachably secured to the fixed section, a holder for a color screen mounted on the stem in position to cover the end of the adjustable section, a collar surrounding the adjustable section and a flange on the stem between said collar and fixed section, so that upon movement of the adjustable section the color screen is adjusted longitudinally of the lens casing therewith.

6. An accessory for a camera having a lens casing comprising a fixed section and an adjustable section, bearings detachably secured to the fixed section, a stem slidably mounted in said bearings, a catch associated with said bearings to limit the sliding movement of the stem, a support on the stem bearing a color screen to be mounted over the end of the adjustable section, and parts on the adjustable section and the stem in engagement so that the movement of the adjustable section causes the screen to move therewith.

7. An accessory for a camera having a lens casing comprising a fixed section and an adjustable section, the accessory comprising a stem to be arranged longitudinally of said casing, bearings in which the stem is slidably received, arms connected with the bearings for gripping the fixed section and mounting the accessory on the lens casing, a catch associated with said bearings to engage the stem and limit the sliding movement thereof, a ring-shaped support on the stem bearing a color screen, said support engaging the end of the adjustable section to hold said screen over the outer end thereof, a collar on the adjustable section and a flange on the stem between the collar and the fixed section to be engaged by said collar so that movement of the adjustable section will cause the accessory to be moved in unison therewith.

Signed at New York in the county of New York and State of New York this 17th day of December, A. D. 1928.

FREEMAN H. OWENS.